May 16, 1950  H. J. SEAMAN ET AL  2,508,195
MATERIAL SPREADER
Filed April 13, 1944  3 Sheets-Sheet 1

INVENTORS
HARRY J. SEAMAN
AND HUGO J. ASCHERIN
BY Christopher L. Waal
ATTORNEY

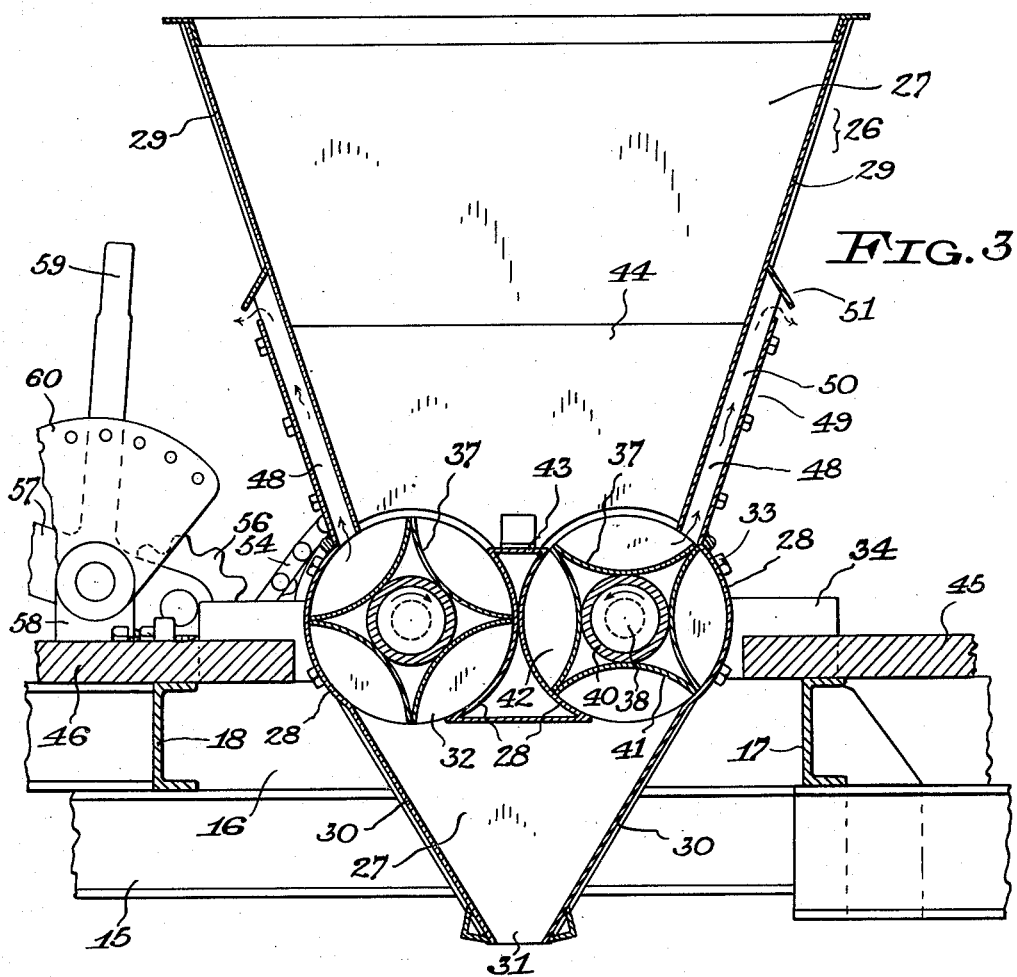
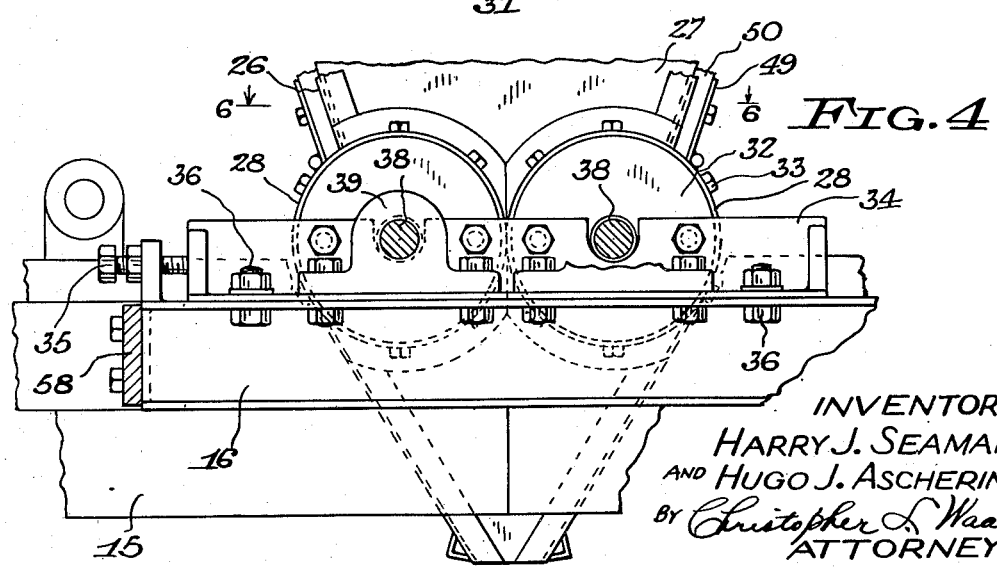

May 16, 1950 H. J. SEAMAN ET AL 2,508,195
MATERIAL SPREADER
Filed April 13, 1944 3 Sheets-Sheet 3
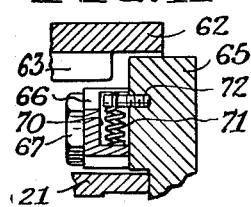
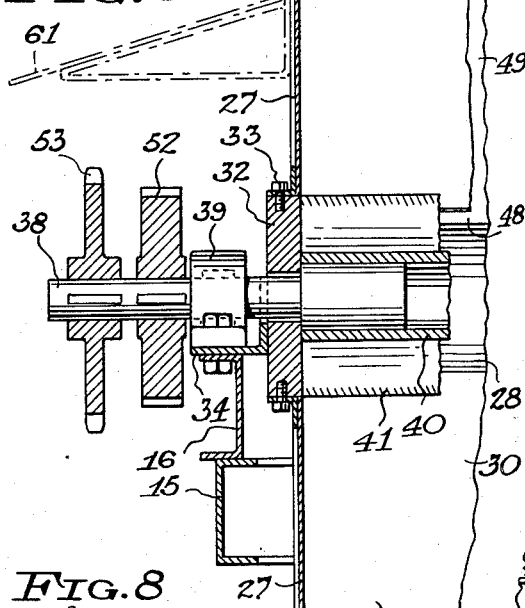
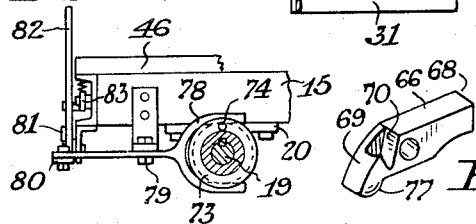
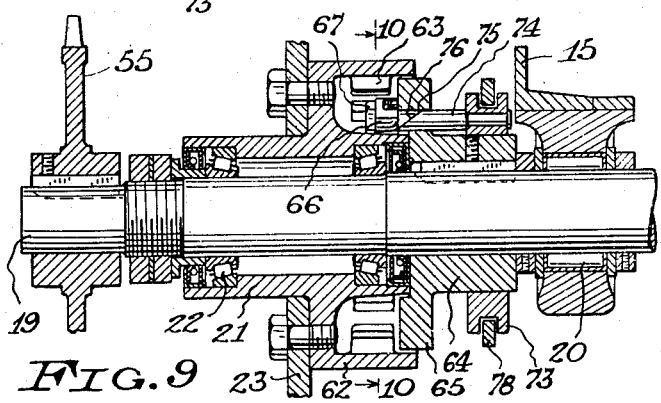
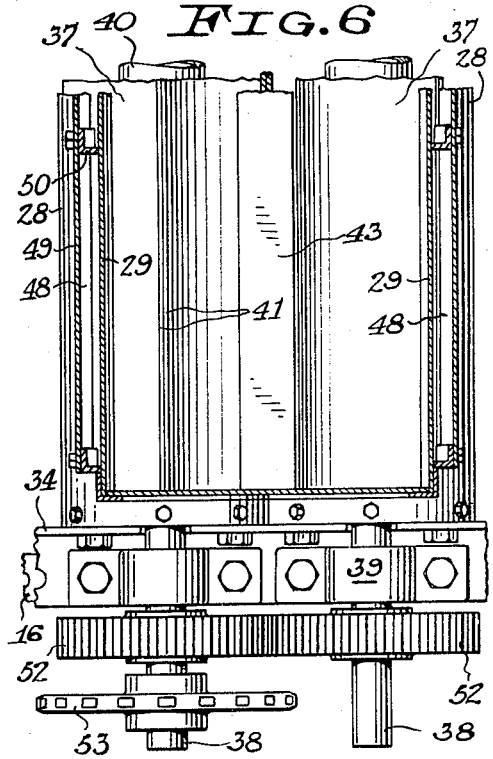
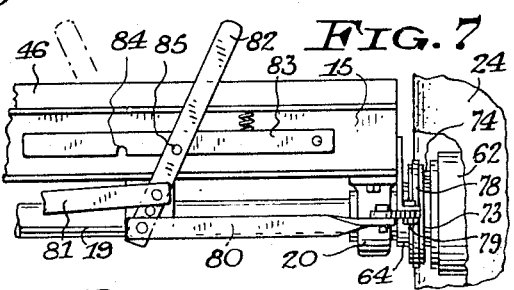
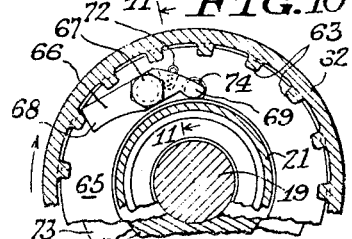
INVENTORS
HARRY J. SEAMAN
AND HUGO J. ASCHERIN
BY Christopher L. Waal
ATTORNEY Patented May 16, 1950

2,508,195

UNITED STATES PATENT OFFICE 2,508,195

MATERIAL SPREADER

Harry J. Seaman, Milwaukee, and Hugo J. Ascherin, Lake, Wis.; said Ascherin assignor to said Seaman Application April 13, 1944, Serial No. 530,802

3 Claims. (Cl. 222—272)

The present invention relates to material spreaders or distributors, and has for an object to provide an improved machine for expeditiously distributing fluent materials, such as road-treating and agricultural materials, one specific use of the machine being to spread Portland cement for the construction of soil-cement roads.

Another object is to provide a machine which shall dispense the material in measured quantities and spread it uniformly over a surface to be treated.

Still another object is to provide simple but effective means for preventing entrapment of air in material-measuring chambers of the mechanism.

A further object is to provide a material spreader of high capacity which requires but relatively small power for operation, permitting the spreader mechanism to be driven from a ground wheel without danger of wheel slippage.

A still further object is to provide a material spreader which is of strong and durable construction and which can be economically manufactured.

The invention further consists in the several features hereinafter described and claimed.

In the accompanying drawings,

Fig. 3 is a sectional elevation taken generally along the line 3—3 of Fig. 2;

Fig. 4 is a sectional elevation taken generally along the line 4—4 of Fig. 2;

Fig. 5 is a sectional elevation taken generally along the line 5—5 of Fig. 1;

Fig. 6 is a sectional view taken generally along the line 6—6 of Fig. 4;

Fig. 7 is a rear view of the machine, parts being broken away;

Fig. 8 is a sectional elevation taken generally along the line 8—8 of Fig. 2;

Fig. 9 is a detail sectional elevation taken generally along the line 9—9 of Fig. 1;

Fig. 10 is a detail sectional elevation taken generally along the line 10—10 of Fig. 9;

Fig. 11 is a detail sectional view taken generally along the line 11—11 of Fig. 10, and Fig. 12 is a perspective view of a ratchet pawl.

Figure 1:
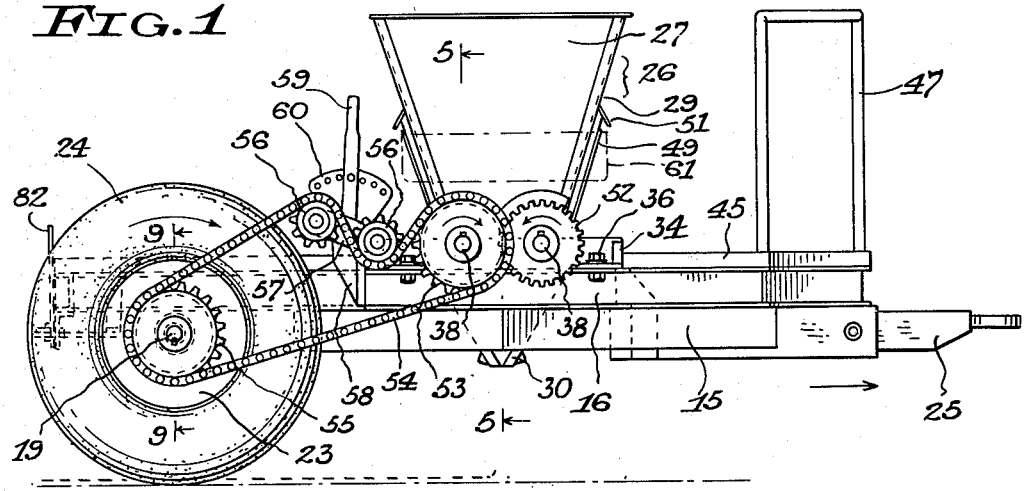
Fig. 1 is a side elevation of a material spreader constructed in accordance with the invention.
Figure 2:
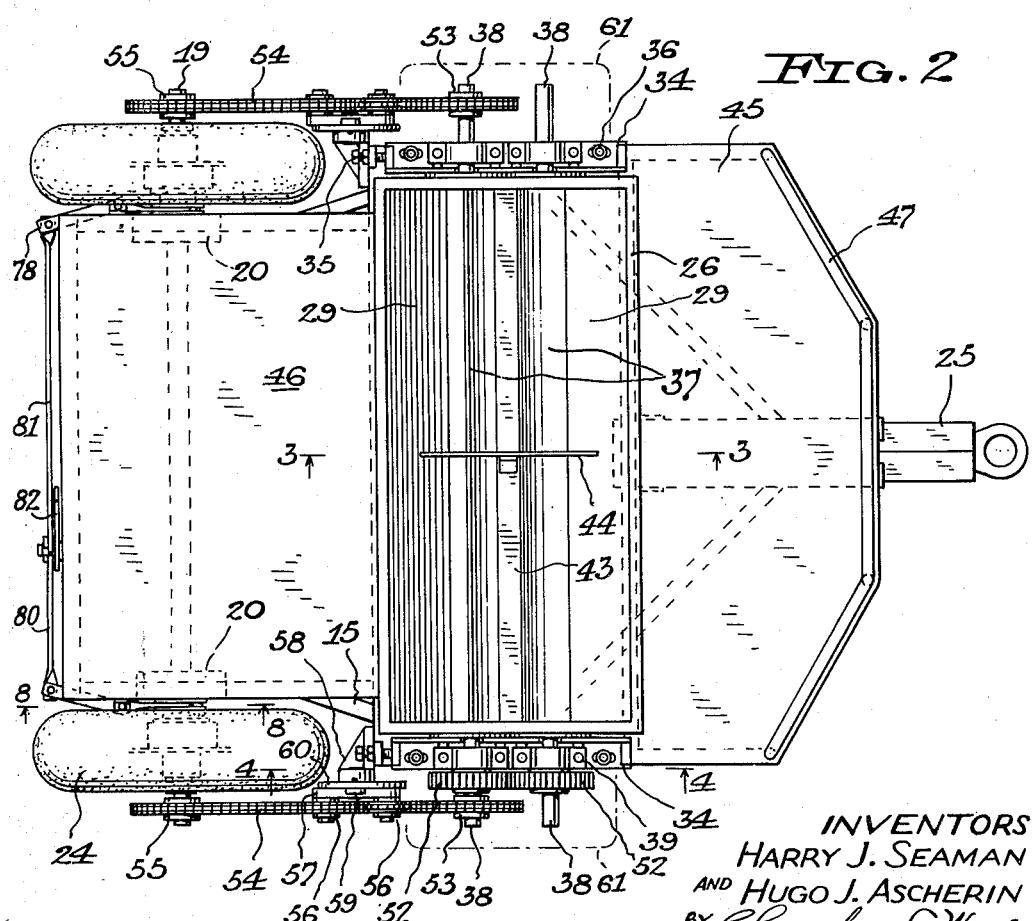
Fig. 2 is a top view thereof.

In these drawings, 15 designates a vehicle frame which is constructed in any suitable manner as by structural shapes welded together, the frame including side members 16 connected by spaced cross members 17 and 18. A transversely extending axle shaft 19 is journalled in roller bearings 20 secured to the rear portion of the frame, and wheel hubs 21 are rotatably mounted on the opposite end portions of the axle shaft by roller bearings 22, Fig. 9, the wheel hubs having releasable driving connections with the axle shaft, as hereinafter described. Road wheels 23 are secured to the hubs 21 and are equipped with pneumatic tires 24. The wheeled trailer vehicle thus formed is provided at its front portion with a suitable towing hitch 25.

A casing 26 with vertical end walls 27 is disposed in the space between the side frame members 16 and cross members 17 and 18 and includes a pair of elongated cylindrical rotor housings 28 arranged side by side in parallel relation and extending transversely of the vehicle. The upper portion of the casing 26 forms a hopper or receptacle with downwardly converging walls 29 connecting the end walls 27, and the portion of the casing below the rotor housing 28 is also of hopper-like shape and includes downwardly converging walls 30, the lower edges of which define a material discharge slot 31 extending transversely of the vehicle. The opposite ends of the rotor housings 28 are closed by centrally apertured cover plates 32 fitting therein and detachably secured thereto by radial screws 33. The casing 26 is supported at opposite ends from the vehicle frame by horizontal angle bars 34 which are bolted to the cover plates and which rest on the frame side members 16. The angle bars 34 are longitudinally adjustable by jack screws 35 and are clamped in adjusted position by bolts 36.

Fluted metering or dispensing rotors 37 rotatably fit in the chambers formed by the respective cylindrical housings 28 and are provided with stub shafts 38 which extend through the cover plates 32 and are journalled in roller bearings 39 secured to the angle bars 34, the angle bars being notched to pass the stub shafts. Each metering rotor comprises a pipe 40 to which several trough-shaped plates 41, four being shown in the present instance, are rigidly secured as by welding, the outer edges of adjacent plates being secured together, as by welding, thus forming partition or division walls for a series of equally spaced longitudinally extending concave grooves or flutes which constitute metering or measuring pockets or chambers 42. The stub shafts 38 are rigidly secured in the opposite ends of the pipe 40. The rotor housings 28 are open at their top portions to receive the pulverized cement or other fluent material from the hopper, and are open at their bottom portions to discharge the material from the rotors. A substantially flat bar 43 extends longitudinally between the upper portions of the rotor housings midway of these housings, and a reenforcing partition plate 44 is secured to the bar 43 and to the sloping walls 29 of the hopper. The horizontal top surface of the bar is at a substantially lower elevation than the uppermost points of the rotor peripheries.

The vehicle frame is provided with front and rear platforms 45 and 46 on which attendants stand while filling the hopper, the front platform being equipped with a guard rail 47. The cement may be introduced into the hopper from bags, or bulk cement may be spouted into the hopper.

During the rotation of the metering rotors there is a tendency for air to become trapped in the rotor pockets as they approach their filling position. In order to vent such air and thus insure complete filling of the pockets, vent passages 48, Figs. 3 and 6, are formed along the sloping hopper walls 29, these passages being defined between the walls 29 and plates 49 spaced outwardly therefrom by spacing bars 50 to which the plates are secured. The upper ends of the vent passages 48 are guarded by sloping eave plates 51, and the lower ends of the passages present slotlike openings communicating with the upper portions of the chambers in the rotor housings 28.

At one end of the casing 26 the projecting parallel rotor shafts 38 are provided with intermeshing gears 52 which are preferably of the same pitch diameter. As indicated in Fig. 3 the two synchronously driven metering rotors are arranged out of phase by 45°, or one-half the pitch of the measuring pockets, and rotate in such direction that the upper parts of the rotors travel toward each and inwardly from the sloping walls 29 of the casing, the pockets of the two rotors alternately reaching their uppermost position. The rear rotor has its opposite stub shafts provided with sprocket wheels 53 which are connected by drive chains 54 to sprocket wheels 55 keyed to the opposite ends of the axle shaft 19. The upper run of each chain is engaged by a pair of idler sprocket wheels 56 rotatably carried on the opposite ends of an angularly adjustable double-armed lever 57 pivotally mounted on a bracket 58 secured to the vehicle frame, the chain passing over one of the sprocket wheels 56 and under the other. The lever 57 is provided with a handle 59 which is adjustably locked to a quadrant plate 60. The chain tightener above described affords a wide range of adjustment, so as to permit the use of various sizes of sprocket wheels 53 and 55 to change the delivery rate of the spreader. If desired, the end walls 27 of the casing 26 may carry sloping guard plates 61 extending over the gears and sprocket wheels on the rotor shafts.

Each wheel hub 21 is provided with a drum 62, Figs. 9 and 10, having internal ratchet teeth 63. A sleeve 64 is keyed on the axle shaft between the wheel hub and the shaft bearing 20 and has an annular flange 65 which fits loosely within the ratchet drum 62. A pawl or dog 66 is pivotally carried on a screw stud 67 secured to the sleeve flange 65 and has a nose 68 engageable with the ratchet teeth and an opposite end portion 69 with a laterally opening spring pocket 70, Figs. 11 and 12. The pawl is urged to engaging position by a coiled compression spring 71 which rests in the pawl pocket 70 and bears against a stud 72 secured to the sleeve flange 65. By this means the road wheel drives the axle shaft which in turn drives the metering rotors 37 through the driving connections hereinbefore described. If one of the road wheels should rotate faster than the other, as when moving along a curve, the faster-moving wheel will form the driver and the spring-pressed pawl at the other wheel will slip past the ratchet teeth.

In order to release the driving connections between the wheel hubs 21 and the sleeve 64, as for road transport of the vehicle, means are provided for disengaging the pawls from the ratchet drums. Each sleeve 64 has slidably mounted thereon an annularly grooved collar 73 which carries a pin 74 extending parallel to the axle shaft. The pin slidably passes through a bore 75 formed in the sleeve flange 65 and has a wedgelike cam-forming end portion 76 which is engageable with a rounded projection 77 formed on the end portion 69 of the pawl, so that inward movement of the pin will release the pawl from the ratchet teeth and permit the wheel hub to rotate freely on its bearings 22, the axle shaft 19 being then stationary. Each collar 73 is axially shiftable by a forked shifting lever extending rearwardly from the collar and pivotally mounted at 79 on the vehicle frame. The rear ends of the shifting levers are connected to respective links 80 and 81 which extend transversely at the rear of the vehicle frame. The inner ends of the links are connected to a hand lever 82 pivotally mounted on the rear portion of the vehicle frame. The hand lever is swingable to opposite clutching and releasing positions and is selectively retained in such positions by a spring-pressed latch bar 83, Fig. 7, pivoted on the frame, the latch bar having notches 84 in its lower edge engageable with a stud 85 on the hand lever.

In the operation of the machine, the hopper of the vehicle is loaded with fluent material, such as Portland cement, and the vehicle is drawn at a suitable slow rate of speed over a roadway or other surface on which the material is to be spread. Upon engaging the ratchet clutches, the metering rotors 37 are rotated in the housings 28, causing the cement to enter and fill the upper rotor pockets and to be carried downwardly by these pockets and then discharged by gravity into the lower portion of the casing from which the cement falls at a substantially uniform rate through the discharge slot 31 onto the roadway. The cement is deposited on the roadway in a layer of substantially uniform thickness, as for use in making a soil-cement road. The air which is trapped in the rotor pockets on the return travel of the pockets is vented through the passages 48, thus permitting complete filling of the pockets with cement and permitting accurate metering. As each pocket fills with cement, some cement may rise a short distance in the adjacent vent passage but this excess cement drops into the next pocket. The upper portions of the rotors move inwardly from the sloping walls 29 of the casing, thus minimizing the tendency of the cement to pack on these walls. During the rotation of the metering rotors, the rotor blades cause an alternating displacement of cement across the horizontal wall or bar 43 connecting the upper portions of the rotor housings, which aids in filling the rotor pockets. The shape and position of the bar 43 also minimizes packing or sticking of the cement. The construction of the rotors and their housings is such as to permit operation with a relatively low power consumption. The out-of-phase relation of the metering rotors tends to provide a uniform rate of material discharge and also reduces the power requirements.

The rate of material discharge can be adjusted by changing the sprocket wheels 53 and 55, the slack in the driving chains being taken up by the tighteners. In some instances, the front metering rotor may be left stationary, as by removing the associated drive gear 52, so as to substantially reduce the rate of delivery of the machine.

The machine can be used for distributing various fluent materials and is particularly suitable for use in the construction of soil-cement roads where it is necessary to mix accurately measured quantities of cement with the soil.

What we claim as new and desire to secure by Letters Patent is:

1. In combination, a rotor housing having a generally horizontal axis and having open upper and lower portions, a receptacle for fluent material communicating with the upper portion of the housing, said receptacle having a wall member the lower edge of which extends longitudinally of the rotor housing, a rotor in said housing having a measuring recess for receiving the material from said receptacle and for discharging the material at the lower portion of the housing, and a second wall member extending approximately parallel to said first wall member and forming between them an air venting passage having a slot forming lower end extending parallel to the rotor axis and communicating with the upper portion of said housing at the filling position of said rotor recess.

2. In combination, a pair of rotor housings arranged side by side on generally horizontal axes and each having open upper and lower portions, a receptacle for fluent material communicating with the upper portions of the housings and having opposed downwardly converging wall members, rotors in said respective housings each having a measuring recess for receiving material from said receptacle and for discharging the material at the lower portions of the housings, the upper portions of said rotors being movable toward each other in their rotation, and a second pair of wall members extending approximately parallel to the respective converging wall members, the pairs of adjacent inner and outer wall members forming between them respective air venting passages having respective slot-forming lower ends extending parallel to the rotor axes and communicating with the upper portions of the respective rotor housings at the filling positions of the rotor recesses.

3. In combination, a pair of rotor housings arranged side by side on generally horizontal axes and each having open upper and lower portions, a receptacle for fluent material communicating with the upper portion of the housings, rotors fitting in and closing said respective housings and each having measuring recesses for receiving material from said receptacle and for discharging the material at the lower portions of the housings, said measuring recesses being equally spaced in a peripheral direction and there being dividing walls between said recesses, said rotors being of substantially the same diameter and having the same angular spacing of their measuring recesses, the upper portions of said rotors being movable toward each other in their rotation, and synchronized driving means for rotating said rotors at the same speed, the pockets of one rotor being at their uppermost position alternately with the pockets of the other rotor, and the adjacent upper portions of said housings having an approximately flat top surface between said rotors and at an elevation substantially lower than the uppermost points of the rotor peripheries.

HARRY J. SEAMAN.
HUGO J. ASCHERIN.

REFERENCES CITED

The following references are of record in the file of this patent:

UNITED STATES PATENTS

| Number | Name | Date |
|---|---|---|
| 255,494 | Curtis et al. | Mar. 28, 1882 |
| 841,111 | Bromley | Jan. 15, 1907 |
| 1,309,059 | Bacon | July 8, 1919 |
| 1,370,764 | Popkess | Mar. 8, 1921 |
| 1,515,993 | Beyer | Nov. 18, 1924 |
| 1,834,628 | Marshall et al. | Dec. 1, 1931 |
| 1,903,874 | Mills et al. | Apr. 18, 1933 |
| 2,339,923 | Griswold et al. | Jan. 25, 1944 |

FOREIGN PATENTS

| Number | Country | Date |
|---|---|---|
| 184,180 | Germany | Sept. 13, 1906 |
| 332,751 | Germany | Feb. 10, 1921 |